United States Patent
Surdu

(10) Patent No.: US 10,146,940 B2
(45) Date of Patent: Dec. 4, 2018

(54) MULTIPLE HARDWARE-SEPARATED COMPUTER OPERATING SYSTEMS WITHIN A SINGLE PROCESSOR COMPUTER SYSTEM TO PREVENT CROSS-CONTAMINATION BETWEEN SYSTEMS

(71) Applicant: Oleksii Surdu, Broadlands, VA (US)

(72) Inventor: Oleksii Surdu, Broadlands, VA (US)

(73) Assignee: GBS Laboratories, LLC, Herndon, VA (US)

( * ) Notice: Subject to any disclaimer, the term of this patent is extended or adjusted under 35 U.S.C. 154(b) by 0 days.

(21) Appl. No.: 15/070,259

(22) Filed: Mar. 15, 2016

(65) Prior Publication Data

US 2018/0032733 A1    Feb. 1, 2018

Related U.S. Application Data

(60) Provisional application No. 62/278,157, filed on Jan. 13, 2016.

(51) Int. Cl.
| | | |
|---|---|---|
| *G06F 9/4401* | (2018.01) | |
| *G06F 21/57* | (2013.01) | |
| *G06F 1/24* | (2006.01) | |
| *G06F 1/32* | (2006.01) | |
| *G06F 9/48* | (2006.01) | |
| *G06F 21/53* | (2013.01) | |

(52) U.S. Cl.
CPC ............ *G06F 21/57* (2013.01); *G06F 1/24* (2013.01); *G06F 1/3287* (2013.01); *G06F 9/441* (2013.01); *G06F 9/4418* (2013.01); *G06F 9/485* (2013.01); *G06F 9/4881* (2013.01); *G06F 21/53* (2013.01); *G06F 21/572* (2013.01); *G06F 21/575* (2013.01); *G06F 2221/034* (2013.01)

(58) Field of Classification Search
CPC ...................................................... G06F 21/57
See application file for complete search history.

(56) References Cited

U.S. PATENT DOCUMENTS

| | | | |
|---|---|---|---|
| 7,356,677 B1 * | 4/2008 | Rafizadeh ............ | G06F 9/4418 713/1 |
| 2001/0018717 A1 | 8/2001 | Shimotono | |
| 2008/0092145 A1 | 4/2008 | Sun et al. | |
| 2008/0184274 A1 | 7/2008 | Ohta et al. | |

(Continued)

OTHER PUBLICATIONS

"How Mobile Malware Breaks Secure Containers", Lacoon, Jul. 2013.

(Continued)

*Primary Examiner* — Kim Huynh
*Assistant Examiner* — Eric Chang
(74) *Attorney, Agent, or Firm* — Capitol City TechLaw, PLLC; Jasbir Singh

(57) ABSTRACT

Using a single processor, separate and independent hardware-enforced operating systems (OS's) are created in a computer, each OS inaccessible by another OS so that malware introduced in one OS cannot access and contaminate another. With a trusted switching mechanism, only one OS is active at any time yet switching between OS's occurs quickly by user action, without need to save open data and/or close the active OS, and/or reboot the inactive OS, yet on activation, the previously inactive OS resumes back where it was left off and no OS rebooting is required.

23 Claims, 3 Drawing Sheets

(56) References Cited

U.S. PATENT DOCUMENTS

| | | | |
|---|---|---|---|
| 2009/0158299 A1* | 6/2009 | Carter | G06F 9/4843 |
| | | | 719/319 |
| 2010/0325405 A1* | 12/2010 | Laue | G06F 9/441 |
| | | | 713/2 |
| 2012/0138685 A1 | 6/2012 | Qu et al. | |
| 2012/0246370 A1 | 9/2012 | Zhang | |

OTHER PUBLICATIONS

"New Virtualization Vulnerability Allows Escape to Hypervisor Attacks", www.darkreading.com, Jun. 2012, printed May 15, 2018.
Blackberry, "file sharing authentication bypass vulnerabilities" and "escalation of privilege vulnerability", BSRT-2014-006.
Tyson T. Brooks, "Security Vulnerability Analysis in Virtualized Computing Environments", International Journal of Intelligent Computing Research, Infonomics Society, Mar./Jun. 2012.

\* cited by examiner

MULTIPLE HARDWARE-SEPARATED COMPUTER OPERATING SYSTEMS WITHIN A SINGLE PROCESSOR COMPUTER SYSTEM TO PREVENT CROSS-CONTAMINATION BETWEEN SYSTEMS

The present application claims the benefit of U.S. Provisional Patent Application No. 62/278,157 filed Jan. 13, 2016.

FIELD OF THE INVENTION

The present invention relates generally to providing multiple computing environments in one physical endpoint computer; providing for hardware-enforced protection of accessing one such internal computing environment from another; and protecting an OS from malware that may be introduced in another OS in the same computer.

BACKGROUND OF THE INVENTION

Computer manufacturers (OEMs) recognize the desirability and need to provide for "data separation" in computers, for a variety of reasons. Data separation is desirable for convenience and organization of data, differentiating privileges to access specific data, and preventing inadvertent contamination of data from infecting and compromising other data, among other purposes. As a result, for several years, numerous data-separation methods have been commercially introduced, chiefly in the form of downloadable applications onto a computer.

These include methods generally known as profiling, containerization, sandboxing, hypervisor-based virtualization, often characterized as "dual persona" to connote a meaningful separation between two data sets in an endpoint computer. Much of this methodology is directed to the growing popularity of "Bring Your Own Device" (BOYD) usage of various endpoint computers, tablets and smartphones by enterprise and government employees.

However, the combination of work-related and personal computing activity on the same computing device as, in turn, encouraged and spurred the growing scourge of organized, sophisticated cybercrime usually in the form of phishing exploit attacks, but others as well (such as keylogging) whereby the end user inadvertently allows malware to access the necessary data to effectively take over the endpoint computer, gain the necessary right to access the end user's network connections, and even obtain sufficient administrative privileges to compromise and steal massive network data. The existing art including the methods described above, do not assure prevention of these forms of attack. Regardless of method, the end user's computer under existing data-separation art contains one set of resources employs some or all of a single set of computer resources (kernel, RAM, drivers, storage), and by doing so the compromised resource can be the conduit to complete computer infection and network access. For example, despite data separation via containers or sandboxes, in an endpoint computer share kernel resources. Likewise, the hypervisor-based host OS shares resources with guest OS's. Profiling is easily compromised as well, by obtaining the rights to access different data segments. Typically, these vulnerabilities are known collectively as "privilege escalation" (and virtual machine escape).

The need to thwart privilege escalation vulnerability is well known and publicized. Examples of publications include: Numerous industry reports detail the inherent vulnerability and other flaws in these methods, e.g.: "How Mobile Malware Breaks Secure Containers"—Lacoon (July 2013); "Security Vulnerability Analysis in Virtualized Computing Environments"—International Journal of Intelligent Computing Research (March/June 2012); "New Virtualization Vulnerability Allows Escape To Hypervisor Attacks"—www.darkreading.com (June 2012); BlackBerry "file sharing authentication bypass vulnerabilities" and "escalation of privilege vulnerability"—www.blackberry.com (BSRT-2014-006)

In fact, reports of massive and costly data breach occurring long after the existing art was introduced indicates the need for an advanced data-separation method to thwart these successful attacks. Since 2013, massive attacks attributed to successful endpoint phishing that allowed the exploits to gain extensive enterprise and government network data, occurred at the U.S. Office of Personal Management, U.S. Department of Homeland Security, JPMorgan Chase, Target stores, the Home Depot, Anthem Healthcare, among numerous others. These share the common vulnerability that the access network was not "locked down", as a true intranet whereby only authorized URL's were accessible, because to have done so, would have seriously hindered usability. Consequently, the successful attack gained sufficient user privileges to ultimately access the target enterprise network to cause harm that at times, has cost a victim over $250 million.

It is apparent that a method is desirable to provide absolute data-segment separation at the endpoint so that on the one hand, the appropriate network data can be locked down, while on the other hand, the use retains the flexibility not only to perform general employment functions in the same computer, but to engage in personal activity without threat that inadvertently, the user will introduce malware able to migrate to network access.

The present invention, through hardware separated operating systems (HSOS's), advances the art to create absolute data separation between the created independent OS's to both prevent cross-contamination between OS's but as well, to do so without restricting typical, wide-ranging usability.

In a preferred embodiment for combining use for business enterprise and personal activity where the enterprise data includes access to sensitive network data, the embodiment provides for three OS's whereby (1) one OS is used for access to a locked-down, restricted network, (2) a second OS is used for general enterprise activity such as business research or receipt of emails from untrusted but seemingly legitimate sources (a method typically used in phishing attacks) and (3) a third OS purely for personal use. In this embodiment, the network data cannot be accessed even if the phishing exploit deceives the user into allowing access to all data in the second OS or third OS.

RELATED ART

The following references identify related art regarding running multiple operating systems on a single processor core.
Ohta (Application 20080184274) describes a switch-source OS controller for switching from one OS to another.
Shimotono (Application 20010018717) describes a computer system with a plurality of operating systems, having an instruction for changing the current operating system, suspend control means, resume control means, and operating switching means.

Sun (Application 20080092145) discloses means for switching operating systems, including identifying a second OS to be active next, configuring a memory controller, and causing the second OS to become active.

Zhang (Application 20120246370) teaches interrupt processing to save the state of the current running OS and switching to a new OS corresponding to the interrupt.

Qu (Application 20120138685) describes a virtual machine monitor supporting a plurality of operating systems and switching OS access to the processor.

FIG. 1 (Prior Art) illustrates a computer system with two OS's such as might be provided by virtual machines, a software scheduling and separation mechanism such as might be provided by a hypervisor or virtual machine monitor, and desired and undesirable accesses by the running OS. The hypervisor provides memory and other resources for the various operating systems, provides access for the operating systems to the processor, slices processor time between running virtual machines and emulates dedicated computer hardware for each operating system. But because there is no separate hardware domain for the hypervisor, it is possible for rootkit malware, e.g., Blue Pill, to insert itself under the hypervisor. Consequently, Second OS 7 may be able to gain undesirable accesses 13 to the storage and memory of First OS 6.

ARM TrustZone, Intel VT-x, and AMD V technologies provide hardware-based protection mechanisms that hypervisors can use to protect against such threats. But because of mobile CPU limitations (performance and battery life) and requirements to virtualize all system hardware in order to have fully isolated virtual machines, mobile devices are not good candidates for virtualization.

It is thus desirable to provide for isolated OS's, as many as are desired, and a small and verifiable monitor without the overhead of full system virtualization, with its own hardware environment separate from the OS kernel and user spaces of the various OS's, to control the dispatching and separation mechanisms of the various OS's.

SUMMARY OF THE INVENTION

The invention consists of an end point computer running one a single processor with multiple isolated and HSOS's and a trusted switching mechanism. At any time while the computer is active, one OS is executing and others are inactive and suspended. When a user initiates a switch from an active OS to a suspended OS, the trusted switching mechanism suspends the active OS, configures or resets its resources (kernel, drivers, storage and memory) so that they are invisible to all OS's, and resumes the previously suspended system where it was left off. This can be repeated as many times as desired by the user.

To prevent malware attacks against the trusted switching mechanism, it is preferable to use a security architecture such as TrustZone from ARM Ltd or other method to run a hardware-protected security monitor and a conventional OS at the same time on a single processor core. The TrustZone monitor runs in a hardware protected domain called the "Secure World" while the OS runs in "Normal World". Secure World software can access Normal World memory, but Normal World memory is blocked by hardware mechanisms from accessing Secure World resources. Because the monitor runs in Secure World memory that cannot be accessed by any OS in Normal World, it cannot be modified or bypassed by an OS.

A user may switch from a first OS to a second OS by performing a configured action (for example, clicking or tapping on icon) or a hardware operation (e.g., a button pushing sequence). This action initiates transfer control from the first OS to the monitor, which suspends the first OS cloaks the resources of the first operating system, resets hardware peripheral devices, uncloaks the resources the second operating system, and resumes the second operating system.

In a first instantiation, to simplify the switching process, all operating systems are started when the device boots and all but the desired OS are suspended. In another instantiation, the desired OS is booted and any remaining operating systems are booted only as they are required during the switching process.

These and other advantages of the present invention will be clarified and become apparent in the Detailed Description and corresponding Drawings.

DETAILED DESCRIPTION OF PREFERRED EMBODIMENTS

This section describes various exemplary embodiments of the present invention with reference to the accompanying drawings. The detailed description of these exemplary embodiments and the corresponding drawings are intended to make it apparent to one of ordinary skill in the art how to construct these exemplary embodiments. Various modifications may become apparent to those skilled in the art, such as other types of security technology, processors, memories, programming techniques, or network protocols. Consequently, the invention is not limited to these exemplary embodiments because the same result may be accomplished with other technologies. And so it should be understood that the present invention is limited only by the scope of the appended claims.

Figure 1:
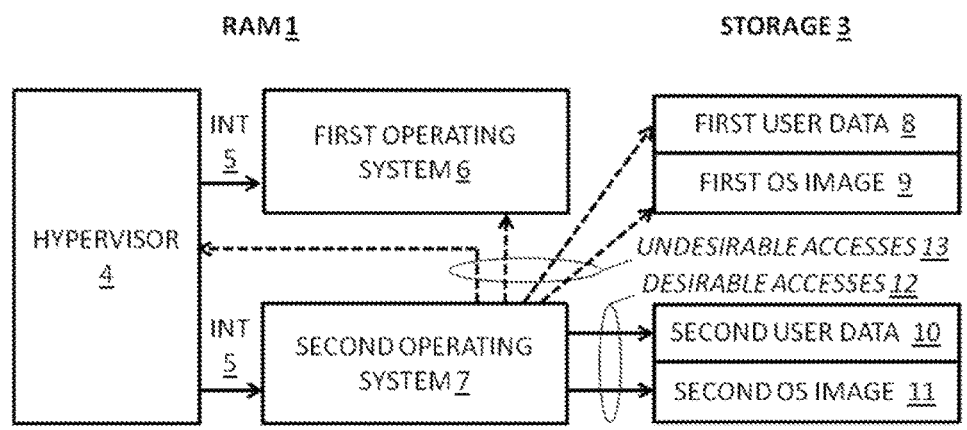
FIG. 1 illustrates prior art, a computer system with two OS's and having accesses from one system to another.

FIG. 1 (Prior Art) illustrates a computer system with OS 6 and OS 7. These OS's may run directly on hardware or on a software virtualization layer. In any event there must be an OS controller such as a Hypervisor 4 that permits only one OS to run at a time and provides protection for each operating system's resources. The OS's request resources such as RAM 1, Storage 3, or the processor by sending interrupts 5 to the Hypervisor 4.

A limited example of an OS controller is a personal computer with firmware, such as BIOS, for selecting and booting one of a multiplicity of operating systems. Once an OS is booted, it has undesirable accesses 13 as well as desirable accesses 12 to the computer's resources, including the boot image and files of other operating systems, until the OS is shut down or the computer is turned off. Conventional OS's provide access to all the computer's resources and sufficiently privileged or authorized application software can access those resources.

A virtual machine (VM) Hypervisor also allows multiple OS's to run concurrently, for example, in a time-sliced manner. The hypervisor virtualizes the physical hardware so each OS has access to its own subset of the computer's physical resources. The hypervisor limits an operating system's access to the computer's resources. But without hardware constraints, such as a separate hardware domain for the hypervisor, these mechanisms are only as good as the hypervisor software. For example, the Blue Pill rootkit can install itself below the hypervisor and thus get all access to the computer. Intel's Trusted Execution Technology (TXT) provides a root of trust that can be used to verify checksums on system firmware, hypervisor code, and individual operating systems, but this is a complicated process that is best applied to servers and not to mobile devices. (Reference: Intel® Trusted Execution Technology white paper, James Greene, Intel Corporation).

What is needed is a hardware-enforced mechanism that can be configured by relatively simple and easily verified trusted firmware to constrain each OS to access only its own resources.

Figure 2:
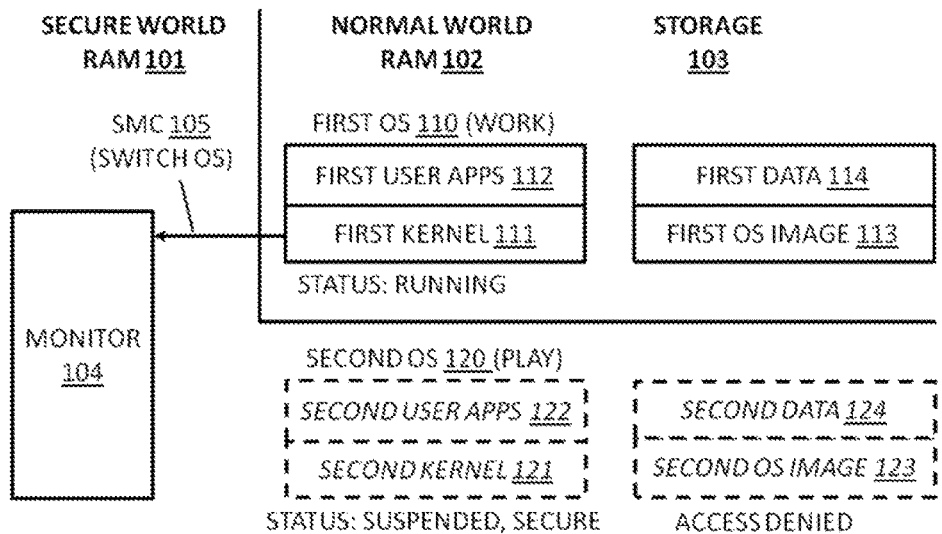
FIG. 2 illustrates a preferred embodiment of the invention, a first OS (running) and a second OS (suspended), and the first OS sending a suspend request to the monitor.

FIG. 2 depicts a preferred embodiment of an inventive mobile device using TrustZone technology by ARM, Inc. The ARM architecture provides a 32-bit Reduced Instruction Set Computing (RISC) architecture with low power requirements that make it the favorite for mobile devices such as tablets and smart phones.

TrustZone is security technology for recent ARM processors that provides a separate Secure World 101 hardware environment for trusted processing that cannot be accessed by OS's running in the Normal World 102. TrustZone extends from the processor (via dedicated bus signals) to TrustZone—aware memory, peripheral and interrupt controllers. For example, an address space controller prevents access to areas of secure DRAM unless the processor is executing code in the Secure World 101. The Secure Configuration Register (SCR) contains a Non-secure (NS) bit to determine whether program execution is in the Normal or Secure worlds.

TrustZone provides a Secure Monitor Call (SMC) instruction and vectoring mechanism 105 for privileged (for example, Linux root) software in the Normal World 102 to switch execution to a Monitor 104 in the Secure World 101. As defined by TrustZone, the Monitor is code that runs in the Secure World 101 and processes transitions for Normal World 102 software to and from the Secure World 101. When a transition occurs, the Monitor operates as an exception handler, saving the processor registers from the previous mode and restoring the registers for the new mode. The Monitor also changes the NS bit to indicate the current world in which software is running.

Direct access by First OS 110 to Storage 103 is denied by configuration of the Central Security Unit (CSU) within the Monitor 104. In order for First OS 110 to access First OS Image 113 or First Data 114, the OS must make a SMC call for read/write flash memory block operations. The Monitor 104 grants the First OS 110 read-only access to First OS Image 113 and read/write access to the First Data 114. Access to all other blocks of the Storage 103 is denied, including Second Data 124 and Second OS image 123.

In this example, the First OS 110 may be configured and managed by an employer and identified as "Work". As OS's are conventionally configured, the First OS 110 includes a First Kernel 111 that operates when the processor is executing in a privileged mode and a collection of First User Apps (Applications) 112 that perform functions for the present operator when the processor is executing in user mode. At this point the First OS 110 has full control of the processor and all hardware that can be accessed in the Normal World 102. The First OS 110 has a First OS Image 113 that was used to boot the First OS 110 and a range of flash memory blocks having one or more file systems used for storing First Data 114, for example, OS configuration data, applications, and user data files.

The Second OS 120 (and potentially additional operating systems) are in a suspended state (enforced by hardware) and thus has no access to any resources used by the First OS 110.

Figure 3:
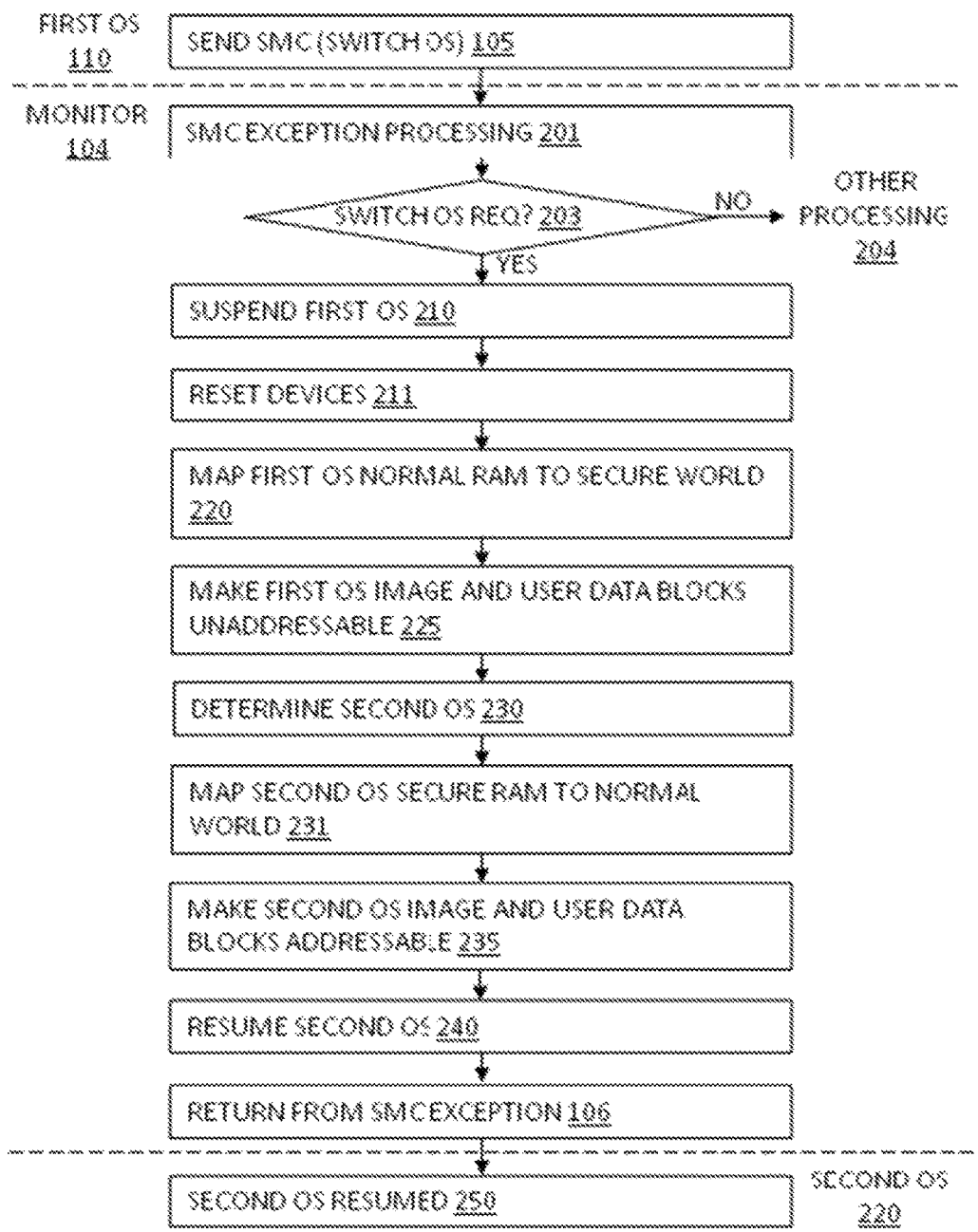
FIG. 3 is a block diagram of the processing performed by the monitor when it receives a request from an OS to suspend and switch operating systems.

FIG. 3 is a block diagram of the processing performed by the Monitor 104 when the First OS 110 sends a Switch OS request 105 to the Monitor 104. This continues with the example illustrated in FIG. 2 wherein, for purposes of identification, the First OS is the OS requesting the switch and the Second OS is the OS that resumes processing after the switch. After a switch, the roles are of course reversed.

The switch from the First OS 110 to a suspended OS such as OS 120 is typically initiated by the user, for example, by a menu input or hand movement on the touch sensitive screen, but it may be appreciated that certain OS scripts or other programmed input may also switch OS's at particular times.

Regardless of how the OS switch is initiated, privileged software within the First OS 110 executes the SMC instruction 105 with a numeric immediate value (argument) specifically indicating the operating system's Switch OS request. The SMC command switches the processor from the First OS 110 in Normal World 102 to the Monitor 104 in Secure World 101 and transfers the immediate value to the Monitor.

Aside from the First OS 110 making the Switch OS 105 request, the trusted Monitor 104 is the only software required for switching from one OS to another while maintaining the security and integrity of both operating systems. It operates within the Secure World 101 as a synchronous library and does not require a separate Secure World OS or applications. As previously described, the Monitor conventionally operates as an exception handler for transitions to and from the Secure World, but the invention extends the concept of Monitor to also perform the OS switching function.

At step 201 the Monitor 104 receives the OS request from the Present OS 110. The Monitor 104 functions at this phase as an exception handler, saving the state of the Normal world and restoring the state of the Secure World at the location to which it switches.

At step 203 the Monitor 104 compares the SMC immediate value to the values of various functions supported by the Monitor. The immediate value has a size of 16 bits, which allows the Monitor 104 to support various other conventional functions unrelated to switching operating systems, for example, performing a cryptographic operation with a key held within the Secure World 101. A request to switch OS's might have an immediate value of 255 while a request to cryptographically sign a buffer might have an immediate value of 8, and there may be other immediate values defined consistent with the functions provided by the Monitor 104. If in step 203 the immediate value of the SMC exception indicates an OS switch request, then processing continues at step 210. Otherwise processing continues at step 204 to identify the function to be performed by the Monitor 104.

At Step 210 the Monitor 104 suspends the First OS 110. The Monitor calls the same suspend code that is used to cut unnecessary power to the device when it is not being used. (An OS may directly invoke this code during periods of inactivity by calling SMC with the immediate value assigned for suspending the operating system.) When an OS is suspended, the suspend mechanism saves the information needed to restore the state in RAM. The suspend code called at step 210 when switching to a different OS shut down the wireless interface, display, and all other power-consuming devices that are not necessary to maintain the machine's state.

At step 211 the Monitor 104 resets devices that are sequentially shared by all operating systems, including input/output buffers and control/status registers for network devices, the display, and virtual keyboards. This is done in order to prevent residual information from a First OS before a switch from being leaked to a different OS after the switch. Block storage devices such as device flash memory are handled separately by allocating non-overlapping regions of memory to each operating system.

Step 220 begins the disclosure of relevant aspects of the OS switching mechanism as distinguished from the normal processing of the TrustZone Monitor.

The mobile device provides random access memory (RAM) for OS and program execution. The system's RAM is pre-allocated to Secure World RAM 101 (e.g., Monitor 104, boot code, cryptographic applications) and to Normal World RAM 102 for each of the various operating systems. A mobile device running TrustZone on an ARM Cortex™—A processor with appropriate bus hardware prevents access from Normal world software, that is, an executing operating system, to Secure World RAM 101. This is how the Monitor is protected from access by an OS running in Normal world.

In keeping with the request from the First OS 110 to suspend and switch to a different operating system, at step 220 the Monitor 104 maps the RAM for the First OS 110 to Secure World RAM 101. This prevents any other OS's running in Normal world RAM 102 from accessing the RAM for the First OS 110.

At this point only the Monitor 104 is running, all OS's are suspended, and the RAM for every OS is mapped to Secure World RAM 101. In order to protect suspended OS RAM, only one OS at a time may occupy Normal world RAM; the Monitor 104 must switch the remaining operating system(s) to Secure World.

At step 225 the Monitor 104 internally reconfigures the Storage Access Table and makes the regions for First OS Image 113 and First Data 114 inaccessible. As described for FIG. 2, accesses to Storage blocks are granted only through secure monitor calls to the Monitor 104.

At step 230 the Monitor 104 identifies the next operating system, i.e., Second OS 220. With only two OS's installed on the mobile device the Monitor 104 will always switch from the active OS to the suspended operating system, but with more than two OS's installed it is necessary to provide a means for the Monitor 104 to resume the proper system.

A first preferred embodiment operates according to a round-robin convention in which the Monitor 104 resumes the next OS in accordance with the OS positions in an OS Table managed by the Monitor 104.

For example, with three OS's installed and the second OS in the table making a switch request, the embodiment would resume the third OS in the table. If the user wishes to use the first operating system, the user may then make a second switch request and the embodiment will resume the first OS in the table.

A second embodiment provides a mechanism such as a menu on the screen for the user to explicitly select the subsequent operating system, which might then be encoded by the requesting OS and decoded by the Monitor 104. For example, with three operating systems, an immediate value of 251 might indicate switching to the first operating system, 252 to the second operating system, and 253 to the third operating system. However, as the round-robin embodiment neatly addresses the use of two OS's without requiring an extra menu and as the time required to suspend an OS and resume the next OS is only a few seconds, the round-robin embodiment will be preferred in most cases.

At step 231 the Monitor 104 maps the Secure World RAM for the Second OS 120 into the Normal world, so it can be accessed by the Second OS 120 when it is resumed. The process for switching OS's is single-threaded, and so it is not possible for another OS to be resumed and have access to this memory. At this point only the Monitor 104 is running, but the RAM is now ready for the Second OS 220 when it is resumed.

At step 235 the Monitor 104 internally reconfigures the Storage Access Table and makes the regions for Second OS Image 123 and Second Data 124 accessible to the Second OS 120. As described for FIG. 2, accesses to Storage blocks are granted only through secure monitor calls to the Monitor 104.

At Step 240 the Monitor 104 resumes operation of the Second OS 120. The Monitor makes a subroutine call to the same resume code that is used by an OS to resume operation when a user becomes active after being suspended. (An OS may directly invoke this resume mechanism by calling SMC with a different immediate value than the value used to switch operating systems.) The resume call re-awakens the network, display, and other devices that were suspended.

Step 106 occurs as the last action when the Monitor 104 resumes the Second OS 120. The Monitor operates as an exception handler, and so must save the processor registers for the Secure World and restore the Normal world registers for the Second OS 120.

At this point the Second OS 120 is resumed and running, and the First OS 110 (and any additional operating systems) are suspended.

Figure 4:
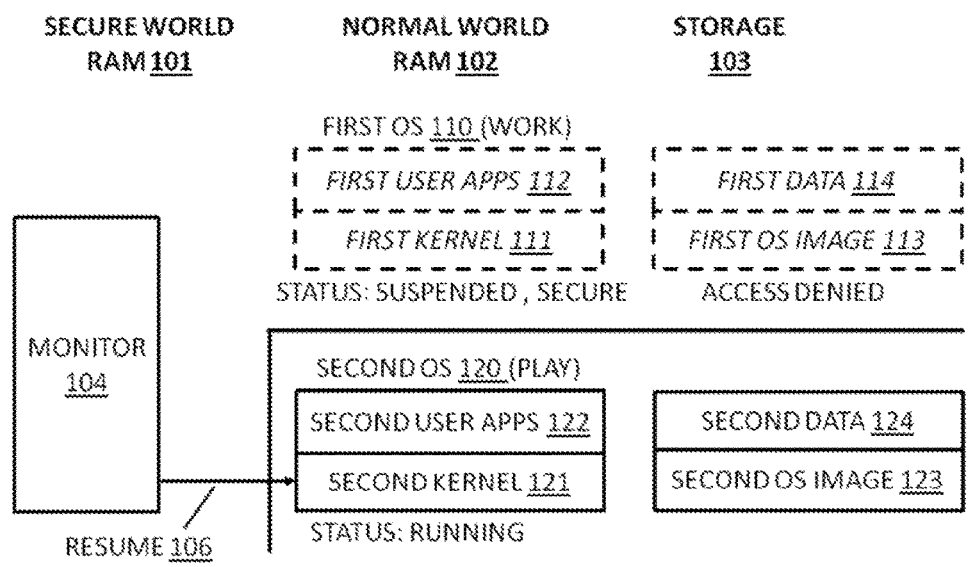
FIG. 4 shows the first OS (suspended by the monitor) and the monitor performing activities to resume the second OS.

FIG. 4 illustrates the new configuration with the Second OS 120 running after the Monitor 104 performs a resume 106. The memory for First OS 110 is configured in Secure World and cannot be accessed by the Second OS 120. Further, the storage partition for the First OS 110 is unmapped and also cannot be accessed by the Second OS 120.

In the preceding description, it is preferable that the Monitor 104 has loaded all participating OS's prior to switching from one OS to another. When the computer is powered up, the Monitor loads the kernels for all systems and then boots one of the operating systems. This strategy is not obvious but means that the Monitor 104 does not require bootstrap code and so the memory can be used for operating systems. The additional time required to load a kernel for an OS is minimal, and mobile devices remain loaded for long periods of time, sleeping when unused, and resuming on demand.

The time required to switch from one OS to another is on the order of a few seconds, which is longer than a context switch for a virtual machine with multiple operating systems, but is much faster and therefore advantageous over other mechanisms for switching from one OS to another. The code base for the Monitor 104 is minimized, which requires less memory and also is small enough to be verified by code analysis as to its trustworthiness. Finally, the power consumption is very low when compared with a virtual memory system. Finally, this design allows each OS to have all of the CPU cycles while it is running. There are limits to how many OS's can be installed, since physical memory and storage must be pre-allocated to each operating system.

It should be appreciated that the terms "First OS" and "Second OS" are for purposes of describing the invention and are not meant to limit the invention to switching only from the First OS 110 (Work) to the Second OS 120 (Play) systems. Rather, the mechanisms for switching OS's while protecting the suspended systems are symmetrical and can be carried out in either direction. Further, mechanisms are consistent from the first cycle (First OS 110 to Second OS 120 back to First OS 110) through multiple cycles.

The present invention is elaborated as using TrustZone to provide a protected environment for a trusted monitor to execute, but the invention can also be practiced with other OS's and hardware architectures when they become available. It will be obvious to one skilled in the art that the invention may have usefulness and application to any computing device requiring a protected switching mechanism for switching among a multiplicity of OS's without the overhead of a virtual machine hypervisor.

The invention claimed is:

1. A method for switching and isolating a plurality of Operating Systems (OS's) on a computer system, the method comprising:
   providing a computer system including a hardware-protected domain to switch Operating Systems (OS's), a memory, an internal device, a first OS assigned to a first memory and active, a second OS assigned to a second memory and suspended, wherein the first memory and the second memory are non-overlapping regions of the memory;
   preventing access to the second memory by the first OS by securing the second memory with the hardware-protected domain;
   receiving a request for initiating a switch from the first OS to the second OS;
   in the hardware-protected domain, Suspending the first OS in response to the request, assigning a secure status to the first memory, resetting the internal device of the computer system, assigning a normal status to the second memory, and returning control to the second OS; and
   resuming the second OS from a previous suspension, wherein only one of the first OS or the second OS are active at a time.

2. The method of claim 1, wherein the suspending further comprises suspending the first OS by resetting or cutting power of the internal device and putting a Central Processing Unit (CPU) and the memory into a minimum power state just sufficient to retain data in the memory.

3. The method of claim 1, wherein the computer system comprises one of a personal computer, laptop, mobile communication device, smartphone or tablet.

4. The method of claim 1, wherein the hardware protected domain comprises TrustZone technology by ARM, Ltd.

5. The method of claim 1, wherein the hardware protected domain comprises Intel Virtualization Technology (VT-x).

6. The method of claim 1, wherein the hardware protected domain comprises AMD Virtualization Technology (AMD-V).

7. The method of claim 1, further comprising booting the first OS and booting the second OS prior to returning control to the second OS.

8. The method of claim 1, wherein the computer system comprises a storage comprising a first storage region that is non-overlapping with a second storage region, and the method further comprises
   granting the first OS access to the first storage region,
   granting the second OS access to the second storage region,
   preventing access of the first storage region by the second OS, and
   preventing access of the second storage region by the first OS.

9. The method of claim 8, wherein the first OS accesses the storage with a non-virtualized driver.

10. The method of claim 1, further comprising preventing access of the hardware-protected domain by the first OS and the second OS.

11. A computer system hosting multiple Operating Systems (OS's) sharing a single processor, the computer system comprising:
    a hardware-protected domain to switch OS's;
    a first OS assigned to a first memory and active;
    a second OS assigned to a second memory and suspended;
    a memory, wherein the first memory and the second memory are non-overlapping regions of the memory;
    an internal device; and
    a monitor to operate in the hardware-protected domain and to:
       prevent access to the second memory by the first OS by securing the second memory with the hardware-protected domain,
       receiving a request for initiating a switch from the first OS to the second OS,
       initiate a switch from the first OS to the second OS,
       suspend the first OS in response to the request,
       assign a secure status to the first memory,
       reset the internal device of the computer system,
       assign a normal status to the second memory,
       return control to the second OS to run, and resume the second OS from a previous suspension,
       wherein only one of the first OS or the second OS are active at a time.

12. The computer system of claim 11, wherein the monitor initiates the switch upon request by a user action.

13. The user action of claim 12, wherein the user action comprises a touch or hand motion on a touch sensitive screen.

14. The computer system of claim 11, wherein the monitor initiates the switch upon request from a program within the first operating system.

15. The computer system of claim 11, the monitor suspends the first OS by resetting or cutting power of the internal device and putting a Central Processing Unit (CPU) and the memory into a minimum power state just sufficient to retain data in the memory.

16. The computer system of claim 11, wherein the monitor prevents a malware from spreading from the first OS to the second OS.

17. The computer system of claim 11, wherein the computer system comprises one of a personal computer, laptop, mobile communication device, smartphone or tablet.

18. The computer system of claim 11, wherein the second OS comprises a plurality of OS's and the monitor operates to select one of the plurality of OS's in a round-robin manner.

19. The computer system of claim 11, wherein the second OS comprises a plurality of OS's and the monitor operates to select one of the plurality of OS's by user action.

20. The computer system of claim 19, wherein the monitor operates to boot the first OS and to boot the second OS prior to returning control to the second OS.

21. The computer system of claim 11, further comprising a storage comprising a first storage region that is non-overlapping with a second storage region, and
wherein the monitor further operates to
grant the first OS access to the first storage region,
grant the second OS access to the second storage region,
prevent access of the first storage region by the second OS, and
prevent access of the second storage region by the first OS.

22. The computer system of claim 21, wherein the first OS comprises a first non-virtualized driver that operates to access the storage.

23. The computer system of claim 11, wherein the monitor operates to prevent access of the hardware-protected domain by the first OS and the second OS.

* * * * *